United States Patent
Yeh (10) Patent No.: US 7,694,040 B2
(45) Date of Patent: Apr. 6, 2010

(54) METHOD AND APPARATUS OF ARRANGING PRIORITY QUEUE AND ARBITRATING FOR MEMORY ACCESS REQUESTS

(75) Inventor: Ting-Kun Yeh, Taipei (TW)

(73) Assignee: VIA Technologies, Inc., Taipei (TW)

( * ) Notice: Subject to any disclaimer, the term of this patent is extended or adjusted under 35 U.S.C. 154(b) by 182 days.

(21) Appl. No.: 11/960,594

(22) Filed: Dec. 19, 2007

(65) Prior Publication Data

US 2008/0098145 A1  Apr. 24, 2008

Related U.S. Application Data

(62) Division of application No. 10/711,518, filed on Sep. 23, 2004, now abandoned.

(30) Foreign Application Priority Data

Dec. 12, 2003 (TW) ............... 92135131 A (51) Int. Cl.
*G06F 3/00* (2006.01)
*G06F 12/00* (2006.01)

(52) U.S. Cl. .............. 710/41; 710/54; 710/244; 711/151

(58) Field of Classification Search ............. 710/36–45, 710/52–55, 244; 711/151
See application file for complete search history.

(56) References Cited

U.S. PATENT DOCUMENTS

| | | | |
|---|---|---|---|
| 5,276,838 A | 1/1994 | Rao et al. | |
| 5,283,903 A * | 2/1994 | Uehara | 710/200 |
| 5,903,776 A * | 5/1999 | Larson | 710/54 |
| 6,000,001 A * | 12/1999 | Larson | 710/244 |
| 6,601,151 B1 * | 7/2003 | Harris | 711/158 |
| 6,779,092 B2 | 8/2004 | Watts | |
| 6,782,441 B1 | 8/2004 | Nguyen et al. | |
| 6,880,028 B2 | 4/2005 | Kurth | |
| 2002/0133676 A1 * | 9/2002 | Oldfield et al. | 711/151 |
| 2003/0163609 A1 * | 8/2003 | Abdo et al. | 710/5 |
| 2003/0177296 A1 | 9/2003 | Kurth | |
| 2003/0217224 A1 | 11/2003 | Watts | |

FOREIGN PATENT DOCUMENTS

| | | |
|---|---|---|
| CN | 1347041 A | 5/2002 |
| CN | 1356639 A | 7/2002 |
| WO | WO 03/071740 | 8/2003 |

OTHER PUBLICATIONS

Hennessy et al., "Computer Organization and Design, the Hardware/Software Interface", 1998, Morgan Kaufmann Publ. Inc. $2^{nd}$ Ed. pp. B-7.

* cited by examiner

*Primary Examiner*—Christopher B Shin
(74) *Attorney, Agent, or Firm*—Squire, Sanders & Dempsey, L.L.P.

(57) ABSTRACT

A method and an apparatus of memory access request priority queue arbitration comprises sorting the requests into plurality of different priority levels firstly. The priority queues of different priority levels are arranged respectively according to the following steps: counting the cycles and latencies of each access request; counting the total cycles; comparing the latencies of each access request and total cycles respectively, if the total cycles is larger than the latency of a request, then arranging one more the same request in the priority queue, else executing the priority queue in order.

13 Claims, 9 Drawing Sheets

| High Priority | | | | |
|---|---|---|---|---|
| Slot | REQ NO. | Burst Length | Cycles(T) | Latency (T) |
| H0 | 3 | 64 | 26 | 128 |
| H1 | 19 | 24 | 10 | 111 |
| H2 | 10 | 12 | 5 | 76 |
| H3 | 23 | 32 | 13 | 140 |
| H4 | 11 | 16 | 6 | 120 |
| H5 | | | 0 | |
| H6 | | | 0 | |
| H7 | | | 0 | |
| H8 | | | 0 | |
| H9 | | | 0 | |
| H10 | | | 0 | |
| H11 | | | 0 | |
| H12 | | | 0 | |
| H13 | | | 0 | |
| H14 | | | 0 | |
| H15 | N | 48 | 20 | |

Totalcycles: 80

| Normal Priority | | | | |
|---|---|---|---|---|
| Slot | REQ NO. | Burst Length | Cycles(T) | Latency(T) |
| N0 | 25 | 8 | 3 | 900 |
| N1 | 21 | 32 | 13 | 261 |
| N2 | 6 | 32 | 13 | 640 |
| N3 | 22 | 32 | 13 | 640 |
| N4 | | | 0 | |
| N5 | | | 0 | |
| N6 | | | 0 | |
| N7 | | | 0 | |
| N8 | | | 0 | |
| N9 | | | 0 | |
| N10 | | | 0 | |
| N11 | | | 0 | |
| N12 | | | 0 | |
| N13 | | | 0 | |
| N14 | | | 0 | |
| N15 | L | 48 | 20 | |

5  62
300
362

| Low Priority | | | | |
|---|---|---|---|---|
| Slot | REQ NO. | Burst Length | Cycles(T) | Latency (T) |
| L0 | 2 | 32 | 13 | 3424 |
| L1 | 5 | 48 | 20 | 4290 |
| L2 | 8 | 32 | 13 | infinite |
| L3 | 18 | 32 | 13 | 3520 |
| L4 | 24 | 32 | 13 | infinite |
| L5 | | | 0 | |
| L6 | | | 0 | |
| L7 | | | 0 | |
| L8 | | | 0 | |
| L9 | | | 0 | |
| L10 | | | 0 | |
| L11 | | | 0 | |
| L12 | | | 0 | |
| L13 | | | 0 | |
| L14 | | | 0 | |
| L15 | | | 0 | |

High Priority

| Slot | REQ NO. | Burst Length | Cycles(T) | Latency (T) |
|---|---|---|---|---|
| H0 | 3 | 64 | 26 | 128 |
| H1 | 19 | 24 | 10 | 111 |
| H2 | 10 | 12 | 5 | 76 |
| H3 | 23 | 32 | 13 | 140 |
| H4 | 11 | 16 | 6 | 120 |
| H5 | 10 | 12 | 5 | 76 |
| H6 |  |  | 0 |  |
| H7 |  |  | 0 |  |
| H8 |  |  | 0 |  |
| H9 |  |  | 0 |  |
| H10 |  |  | 0 |  |
| H11 |  |  | 0 |  |
| H12 |  |  | 0 |  |
| H13 |  |  | 0 |  |
| H14 |  |  | 0 |  |
| H15 | N | 48 | 20 |  |

Totalcycles: 85

Normal Priority

| Slot | REQ NO. | Burst Length | Cycles(T) | Latency (T) |
|---|---|---|---|---|
| N0 | 25 | 8 | 3 | 900 |
| N1 | 21 | 32 | 13 | 261 |
| N2 | 6 | 32 | 13 | 640 |
| N3 | 22 | 32 | 13 | 640 |
| N4 | 21 | 32 | 13 | 261 |
| N5 |  |  | 0 |  |
| N6 |  |  | 0 |  |
| N7 |  |  | 0 |  |
| N8 |  |  | 0 |  |
| N9 |  |  | 0 |  |
| N10 |  |  | 0 |  |
| N11 |  |  | 0 |  |
| N12 |  |  | 0 |  |
| N13 |  |  | 0 |  |
| N14 |  |  | 0 |  |
| N15 | L | 48 | 20 |  |

62
5  300
365

Low Priority

| Slot | REQ NO. | Burst Length | Cycles(T) | Latency (T) |
|---|---|---|---|---|
| L0 | 2 | 32 | 13 | 3424 |
| L1 | 5 | 48 | 20 | 4290 |
| L2 | 8 | 32 | 13 | infinite |
| L3 | 18 | 32 | 13 | 3520 |
| L4 | 24 | 32 | 13 | infinite |
| L5 |  |  | 0 |  |
| L6 |  |  | 0 |  |
| L7 |  |  | 0 |  |
| L8 |  |  | 0 |  |
| L9 |  |  | 0 |  |
| L10 |  |  | 0 |  |
| L11 |  |  | 0 |  |
| L12 |  |  | 0 |  |
| L13 |  |  | 0 |  |
| L14 |  |  | 0 |  |
| L15 |  |  | 0 |  |

METHOD AND APPARATUS OF ARRANGING PRIORITY QUEUE AND ARBITRATING FOR MEMORY ACCESS REQUESTS

CROSS REFERENCE TO RELATED APPLICATION

This application is a division of the U.S. patent application Ser. No. 10/711,518 filed on Sep. 23, 2004 now abandoned. The entire disclosure of the earlier application is hereby incorporated by reference.

BACKGROUND OF THE INVENTION

1. Field of the Invention

The present invention generally relates to a method and an apparatus of priority arbitration, and more particularly to a method and an apparatus of arranging priority queue for an arbiter within a memory access interface.

2. Description of the Related Art

As the requirement of consumer media electronic products increases, in order to enhance the product competition, the concept of SoC (System On Chip) has become a trend. Due to the device integrated, the chip with SoC concept has less power consumption, greater heat dissipation, and better signal transmission quality. Moreover, the concept of SoC puts more and more devices into one single chip, so each device in this chip has to be integrated or reduced its size in order to meet the requirement of SoC. With the integration of devices, the use of devices and substrates can be reduced. Due to the size reduction of devices, the volume of chip is reduced, and also the package is reduced, so the cost of the chip designed with the concept of SoC can be reduced. One of the most widely used consumer media electronic products is multi-media player.

In order to process different types of video and audio signals, a well-known multi-media player comprises many microprocessors with different functions, for example, a video decoder unit is necessary to process video signals; a digital signal processor (DSP) is necessary to process audio signals. Additionally, amounts of memory modules are needed for a well-known multi-media player to handle large data transportation and storage of firmware.

A memory interface exists between microprocessor and its corresponding memory modules for establishing contact in the access. To make requests accessing efficient, the memory interface comprises an arbiter, determining which one of the access requests asked by the microprocessor has the priority and deciding which one of the access requests can use the bus bandwidth. Before arbitrating the priority of bus bandwidth, a standard of bus bandwidth sequence which is called priority queue must be setup. It decides which one of the access requests has the priority to use bus bandwidth based on priority queue when a plurality of access requests are asking at the same time.

Figure 1:
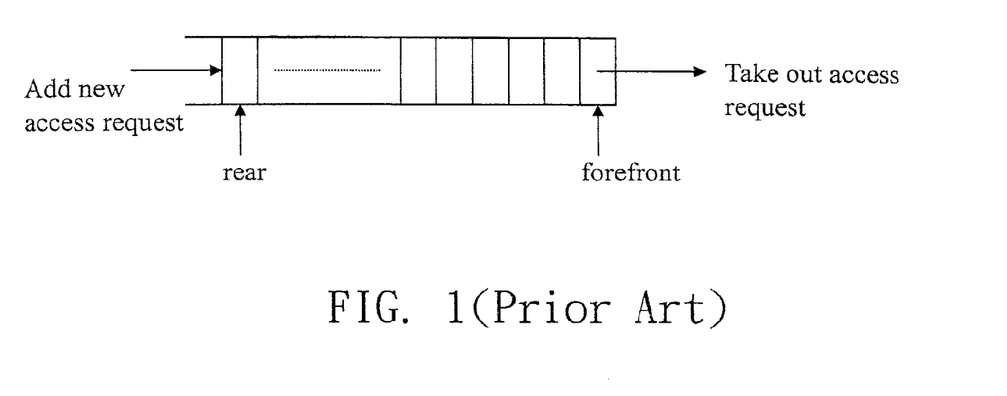

A well-known arrangement of queue is shown in FIG. 1 with a concept of first in first out (FIFO). The first asked access request has the highest priority, which is arranged in forefront (front in queue) position and must be executed firstly. After finishing executing the forefront access request, the other access requests are pushed forward and a new access request is added into the last position (rear in queue) of the queue.

Because of the trend of the concept of SoC (System On Chip) and reduction of memory space in systems, an invention of sharing memory address and data buses is provided earlier, where some parts of system with same functions are integrated or shared. All microprocessors have to access shared memory and data buses via a shard memory interface in the system. Therefore a better method of arranging priority queue and an efficient arbitrative apparatus is necessary to decide the request priority of a system with amounts of access requests. Consequently, system performance is increased.

SUMMARY OF THE INVENTION

The present invention provides a method and an apparatus of priority arbitration for deciding which one of the access requests has the priority and which one of the access requests can use bus bandwidth when a large amount of access requests are asked at the same time without increasing accessing speed and bus bandwidth.

The present invention also provides a method of arranging priority queue. When a higher priority access request exists in the highest level priority queue, it prevents system fail if the higher priority access request is not executed within a certain time.

A preferred embodiment of present invention firstly separates a plurality of access requests into a plurality of priority levels. A plurality of access requests of each priority level are arranged into a priority queue, and the arranging method comprises the following steps: counting cycles and latency of each access request; counting total cycles of all access requests; comparing latency and total cycles of each access request, if latency of an access request is smaller than total cycle, then additionally arranging the same access request into the priority queue once again, else executing the plurality of access requests according to the sequence of priority queue.

A preferred embodiment of the present invention provides an arbiter, comprising of three arbitrative apparatus which have different priority levels, and each arbitrative apparatus with its own priority level at least comprises of: a plurality of request multiplexers for selecting a plurality of access requests of the priority level; and an ownership selector for arranging priority queue. In addition, an arbitrative apparatus with its own priority level further comprises of: an OR gate coupled to the arbitrative apparatus of one higher priority level for informing the priority level whether there is any access request is asked, if there is, then arranging the access request into the last position of the priority queue of the higher priority level; and a AND gate coupled to the ownership selector of one lower priority level for asking the lower priority level to point out the next access request when the next access request is at the last position of the priority queue.

BRIEF DESCRIPTION OF THE DRAWINGS

The accompanying drawings are included to provide a further understanding of the invention, and are incorporated in and constitute a part of this specification. The drawings illustrate embodiments of the invention and together with the description, serve to explain the principles of the invention. In the drawings, FIG. 1 schematically shows a general purpose way (first in first out, FIFO) of arranging priority queue.

DETAILED DESCRIPTION

The present invention provides a method of arranging priority queue for an arbiter of a memory interface in multi-media player, also provides an apparatus and a method for arbitrating of different priority levels. In this way, when amounts of access requests are asked at the same time, system determines the one access request which is needed to be executed immediately according to the respected priority of each access request and prevents access request fail or system function fail.

A preferred embodiment is given as the following to enable one skilled in the art to make and use the present invention as provided within the context of a particular application and its requirements. Various modifications to the preferred embodiment will, however, be apparent to one skilled in the art, and the general principles defined herein may be applied to other embodiments. Therefore the present invention is not intended to be limited to the particular embodiments shown and described herein, but is to be accorded the widest herein disclosed.

Firstly, separating a plurality of access requests asked from at least one microprocessor into three different priority levels: high priority level, normal priority level and low priority level respectively. A plurality of access requests in each different priority level are arranged as a priority queue and each access request has a corresponding request number. Priority level of an access request can be dynamically adjusted according to the use condition, for example, request access priority of servo controller when playing VCD (Video Compact Disk) is higher than playing DVD (Digital Versatile Disk) due to the higher frequency of reading disk data; request access priority of MPEG (Moving Picture Experts Group) decoder when playing DVD is higher than playing VCD due to the higher requirements of MPEG decoder.

Then executing the access requests according to the sequence of high level priority queue, simultaneously the next access request which has the priority is asked and wait. When one access request is in turn to be executed but it is not asked, then executing the next access request. After total access requests of high priority level are once executed, check if there is any access request asked in normal priority level, if there is not, then going back to execute high level priority queue; if there is, then executing one access request of normal priority level then going back to high level priority queue. That is to say, when finishing executing a cycle of high priority queue, then executing one access request of normal priority level and going back to execute high level priority queue; after finishing executing a cycle of normal priority queue, then executing one access request of low priority level and going back to execute high level priority queue.

Figure 2:
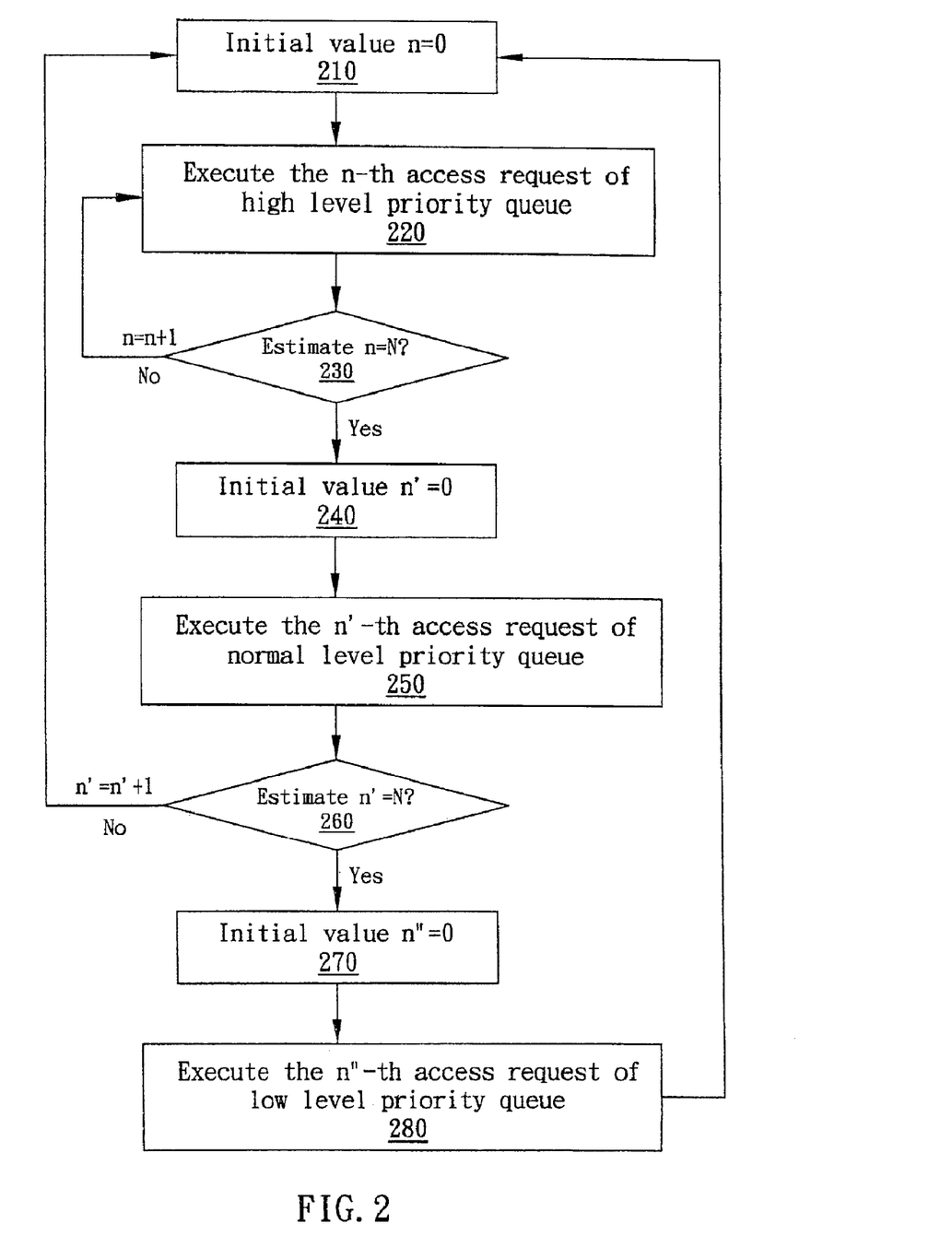
FIG. 2 schematically shows an executing flow chart of different priority levels in present invention.

The flow chart is described below and shown in FIG. 2:

Assume there has N access requests of high priority level, normal priority level and low priority level respectively,
210 initial value n=0;
220 executing the n-th access request of high level priority queue;
230 estimating if n=N?;
if not, then n=n+1 and go back to step 220;
if yes, then
240 initial value n'=0;
250 executing the n'-th access request of normal level priority queue;
260 estimating if n'=N?
if not, then n'=n'+1 and go back to step 210;
if yes, then
270 initial value n"=0; and
280 executing the n"-th access request of low level priority queue, and then back to step 210.

Figure 8:
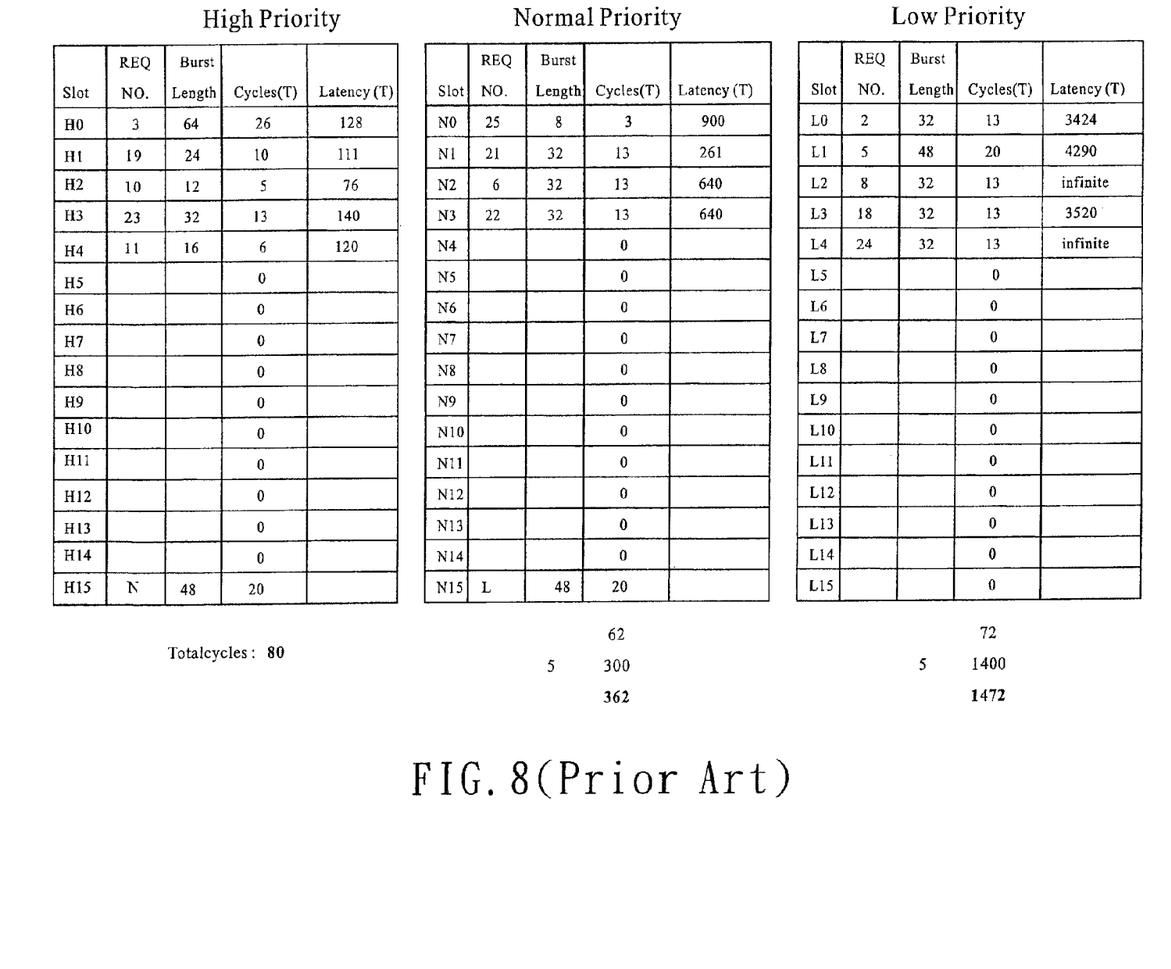
FIG. 8 shows a general priority queue arrangement.

A well-known method of arranging priority queue is shown in FIG. 8. Take the third access request (slot H2, request No. 10) of high level priority queue as a example, under the worst case in which all of these access requests are asked, the during cycles between executing request No. 10 is at least the total cycles of high level priority queue 26+10+5+13+6+20=80 Ts (Ts: tera second, Tera=1e+12). That is to say, request No. 10 must wait for 80 Ts before it can be executed again. But it is noticed that the total cycles 80 Ts is larger than the latency of request No. 10, 76 Ts, and therefore, under the worst case, system can't execute request No. 10 within 76 Ts. As a results, the request No. 10 will fail. Generally, in order to solve this problem, one way is re-arranging one lower priority access request of high level priority queue into normal level priority queue, but it may also cause the access request of normal priority level fail; another way is speeding up accessing speed or increasing bus bandwidth to reduce executing cycles of each access request.

Figure 9:
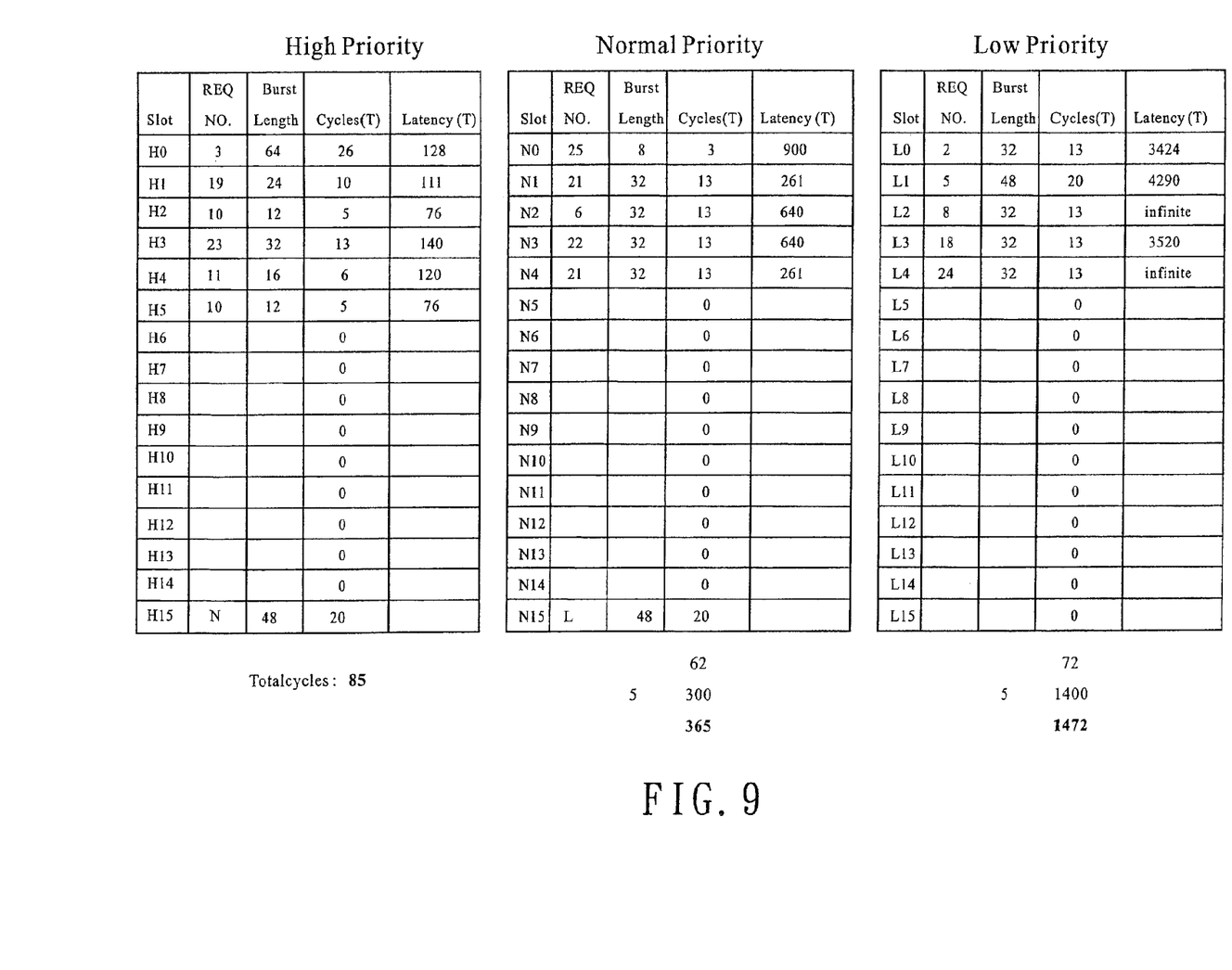
FIG. 9 shows a priority queue arrangement of the present invention.

In the present invention, additional request No. 10 is arranged into the high level priority queue once again (shown in FIG. 9 slot H5). Although the total cycles are increased to 85 Ts (26+10+5+13+6+5+20=85), request No. 10 is executed twice in high level priority queue and the during cycles between executing request No. 10 is reduced (shown in FIG. 9, the during cycles are respectively 13+6=19 Ts and 20+26+10=56 Ts, and both are smaller than new total cycles 85 Ts). Therefore, even under the worst case, the access request of request No. 10 is satisfied.

The method of arranging priority queue in the present invention comprises the following steps: counting latency and cycles of all access requests of each priority queue (cycles means the spending time of executing an access request; latency means the longest waiting time before an access request is accepted, and if the access request is not accepted in its latency, the access request will fail, so that the system function fail; both units are Ts); counting total cycles of all access requests in priority queue; comparing latency of each access request with total cycles under the worst case respectively, if latency of an access request is smaller than total cycles, then the same access request should be additional arranged into the priority queue once again (the access request is called nonsatisfied access request in which the latency is smaller than total cycles of all access requests in priority queue), else executing access requests according to the sequence of priority queue. However, when an additional access request is arranged in priority queue, then counting the maximum during cycles between the two same access requests; then comparing the latency with the maximum during cycles, if the latency is still smaller than the maximum during cycles, then another the same access request is arranged into the priority again. Repeat this step (recounting maximum during cycles and comparing with the latency between two same access requests), until the nonsatisfied access request can be successfully executed in time. Finally, as some additional access requests are arranged into the priority queue, recounting new total cycle, and comparing with latency again and following the steps above until all access requests in priority queue can be executed successfully during total cycles. Further, the position of the additional access request is the position which has the average during cycles between two same access requests.

Figure 3:
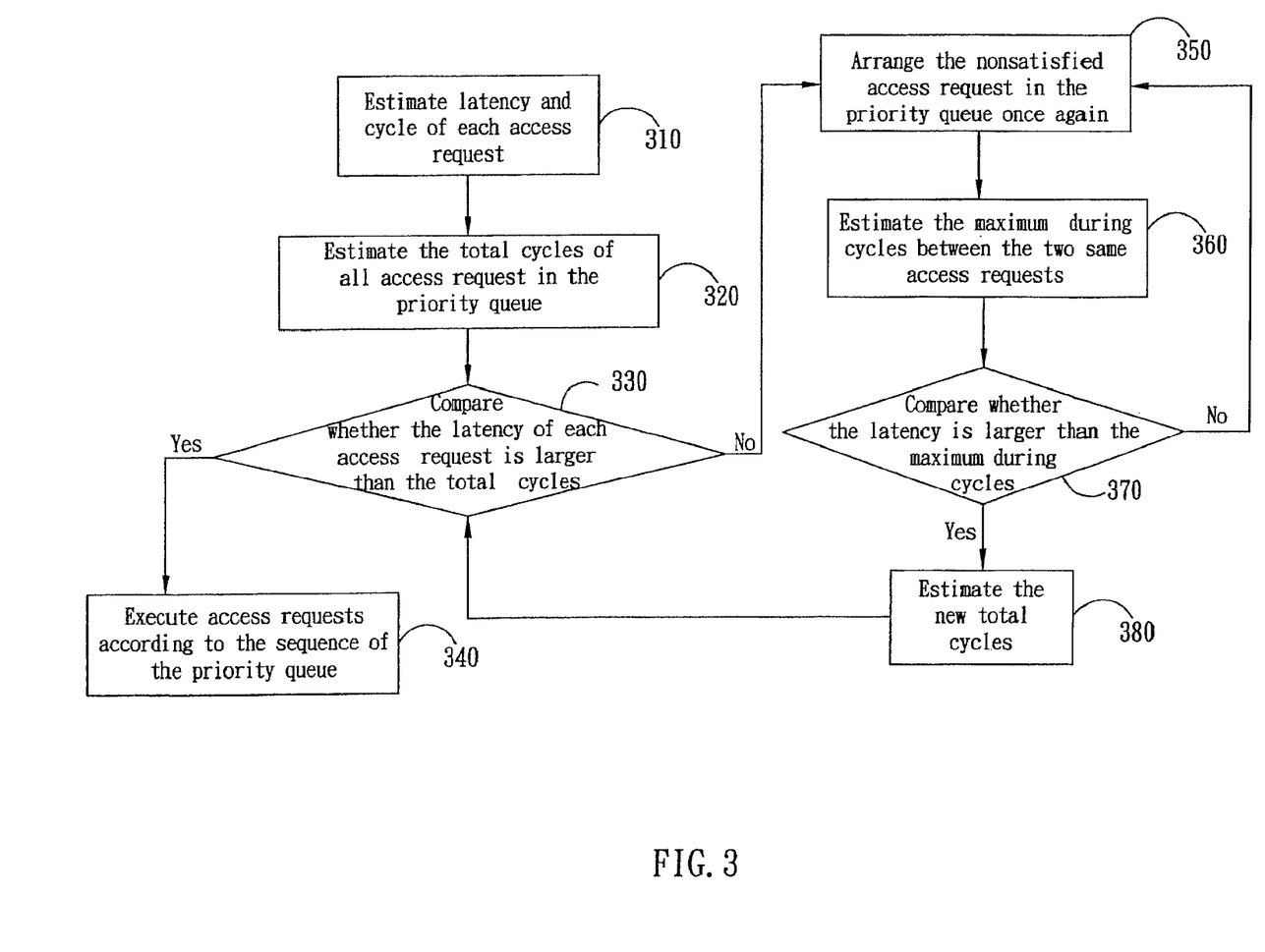
FIG. 3 schematically shows a flow chart of arranging method of priority queue in present invention.

The method of arranging priority queue in the present invention is described below and shown in FIG. 3:

310 counting cycles and latency of each access request;
320 counting total cycles of all access requests in priority queue;
330 comparing that latency of each access request is larger than the total cycles;
If yes, then
340 executing access requests according to the sequence of priority queue;
If no, then
350 additionally arranging the nonsatisfied access request into the priority queue once again;
360 counting the maximum during cycles between the two same access requests;
370 comparing whether the latency is larger than the maximum during cycles;
If latency is larger than the maximum during cycles;
If no, then go back to step 350, step 360 and step 370;
If yes, then
380 recounting new total cycles; and executing the step 330.

Every time when an additional access request is arranged into the priority queue, the new total cycles are recounted, then comparing with latencies again until all access requests in priority queue can be executing during total cycles.

Figure 4:
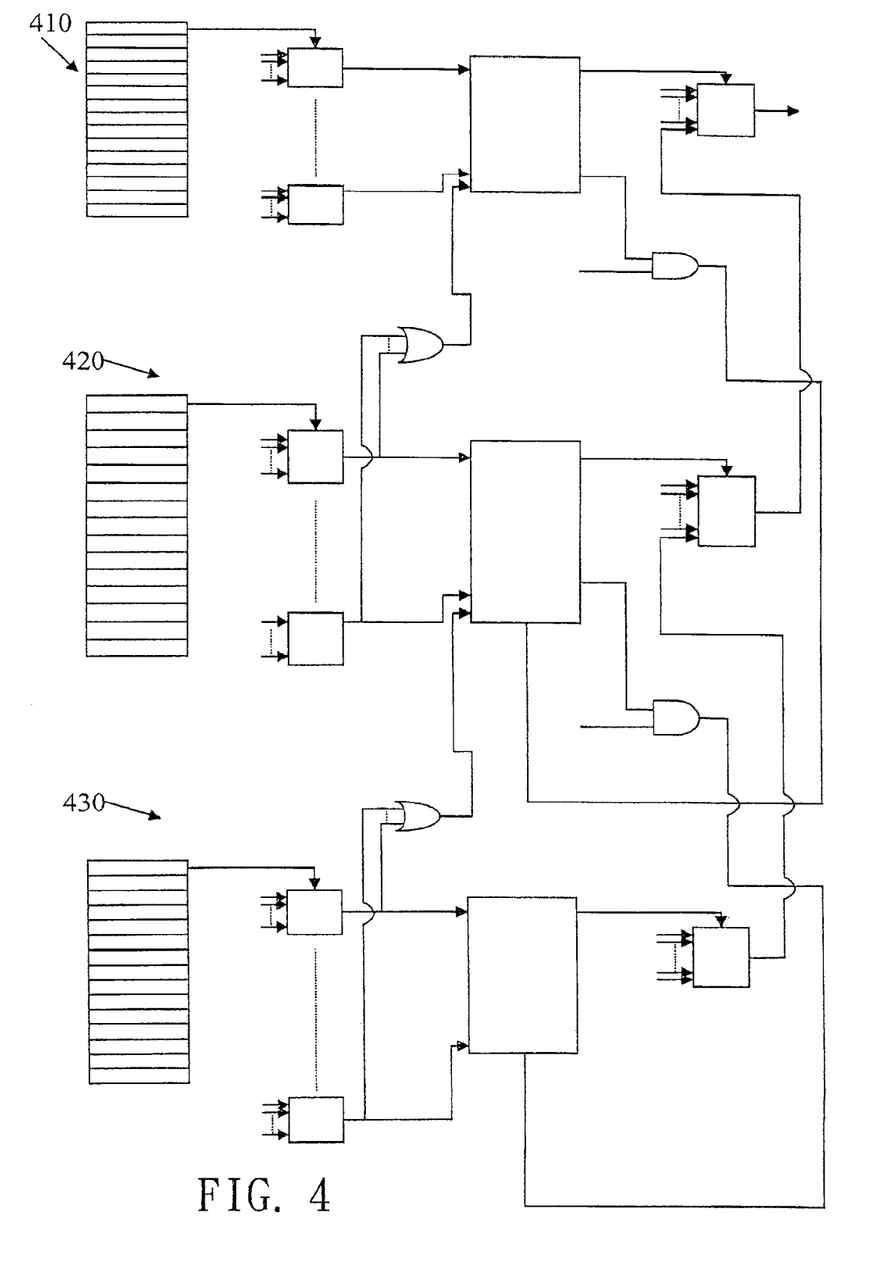
FIG. 4 schematically shows arbiter architecture of the present invention.

As the method of arranging priority queue described above, the method can be used in an arbitrative apparatus. An arbiter of the present invention is shown in FIG. 4, which at least comprises three arbitrative apparatus with different priority levels, a high level arbitrative apparatus 410, a normal level arbitrative apparatus 420, and a low level arbitrative apparatus 430 respectively, wherein each arbitrative apparatus is similar, and a detail description is as the following.

Figure 5:
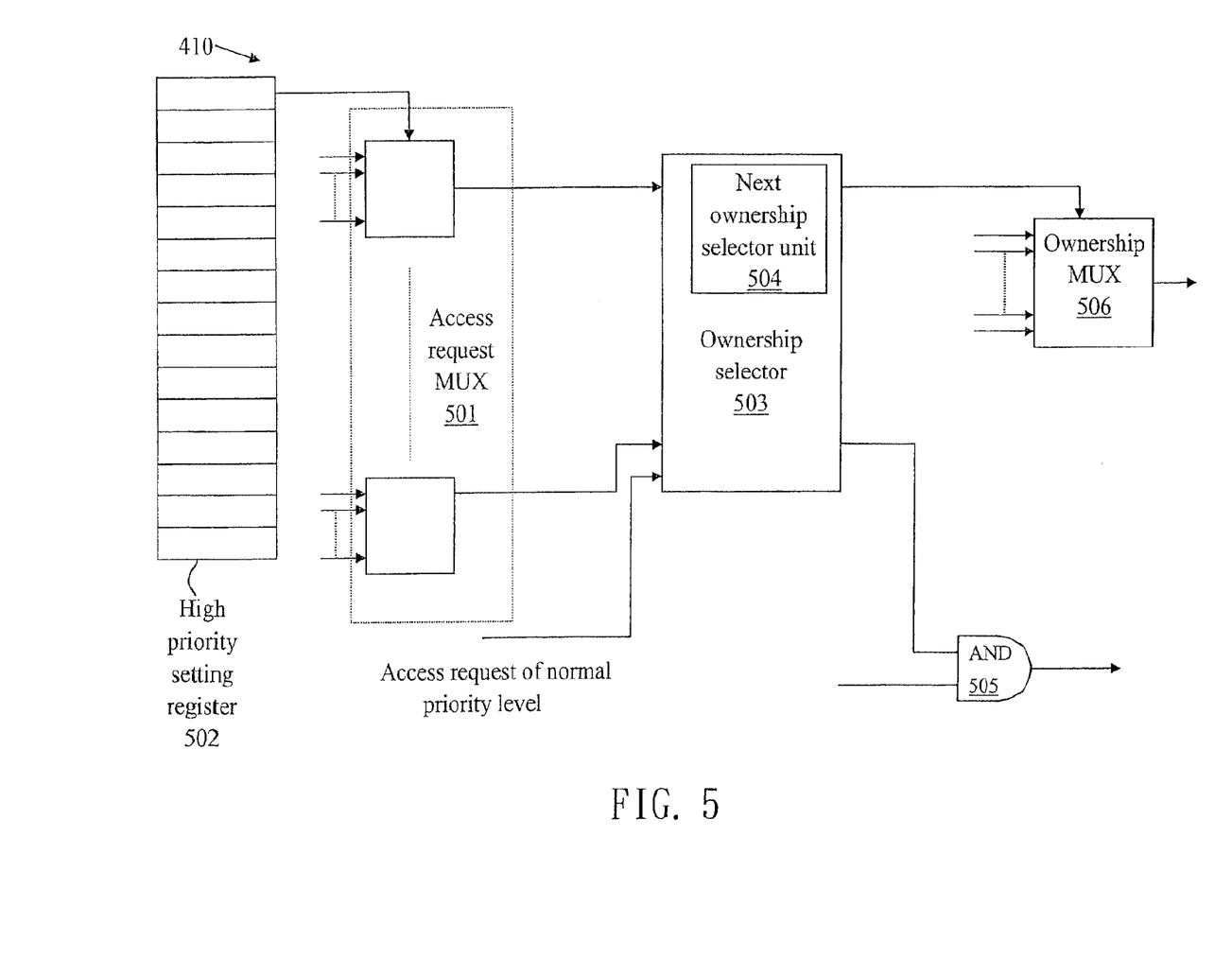
FIG. 5 schematically shows a high level arbitrative apparatus in present invention.

Refer to FIG. 5, the high level arbitrative apparatus 410 comprises of: a plurality of access request MUXs (multiplexers) 501, each one of the access request MUXs 501 receives all access requests respectively and selects one access request grouped to high priority level from those access requests respectively; a high priority setting register 502 setting request number to show which access requests belongs to high priority level; an ownership selector 503, receiving a plurality of access requests which are selected by a plurality of access request MUXs 501, and arranging those selected access requests into a high level priority queue, the ownership selector 503 keeps the last position of high level priority queue for arranging an access request of normal priority level; an ownership MUX 506, finding out the next access request which is waiting for being executed. Furthermore, the ownership selector 503 comprises a next ownership selector unit 504. When an access request is being executed, an asking point out signal is sent out, then the next ownership selector unit 504 points out the position of the next access request and the ownership MUX 506 finds the corresponding request number from high priority setting register 502 according to the position of high priority level priority queue.

Figure 6:
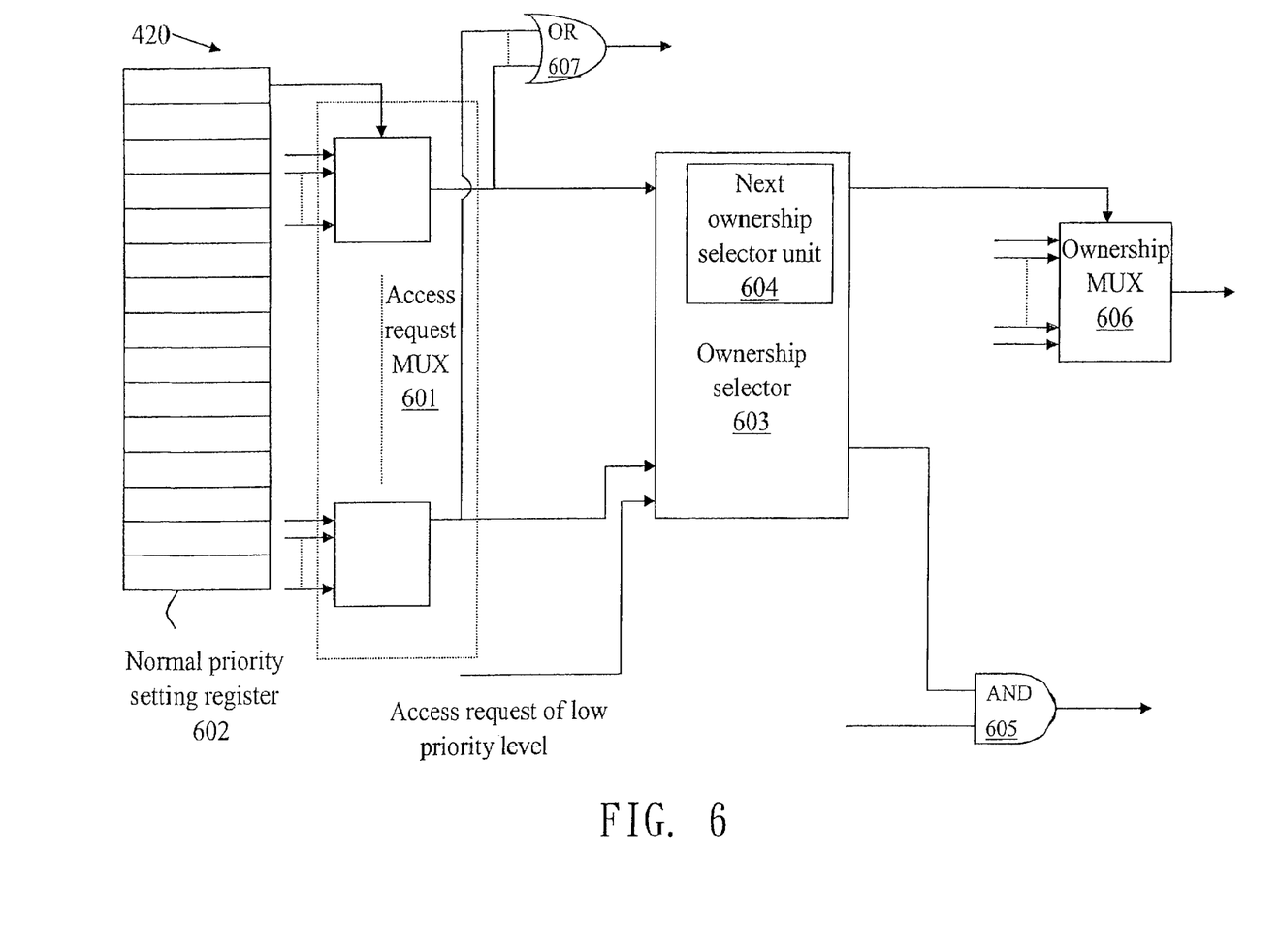
FIG. 6 schematically shows a normal level arbitrative apparatus in present invention.

Refer to FIG. 6, the normal level arbitrative apparatus 420 comprises of: a plurality of access request MUXs (multiplexers) 601, each one of the access request MUXs 601 receives all access requests respectively and selects one access request grouped to normal priority level from those access requests respectively; a normal priority setting register 602, setting request number to show which access requests belongs to normal priority level; an ownership selector 603, receiving a plurality of access requests which are selected by a plurality of access request MUXs 601, and arranging those selected access requests into a normal level priority queue, the ownership selector 603 keeps the last position of normal level priority queue for arranging an access request of low priority level; an ownership MUX 606, finding out the next access request which is waiting for being executed. Furthermore, the ownership selector 603 comprises a next ownership selector unit 604. When an access request is being executed, an asking point out signal is sent out, then the next ownership selector unit 604 points out the position of the next access request and the ownership MUX 606 finds the corresponding request number from normal priority setting register 602 according to the position of normal level priority queue.

Figure 7:
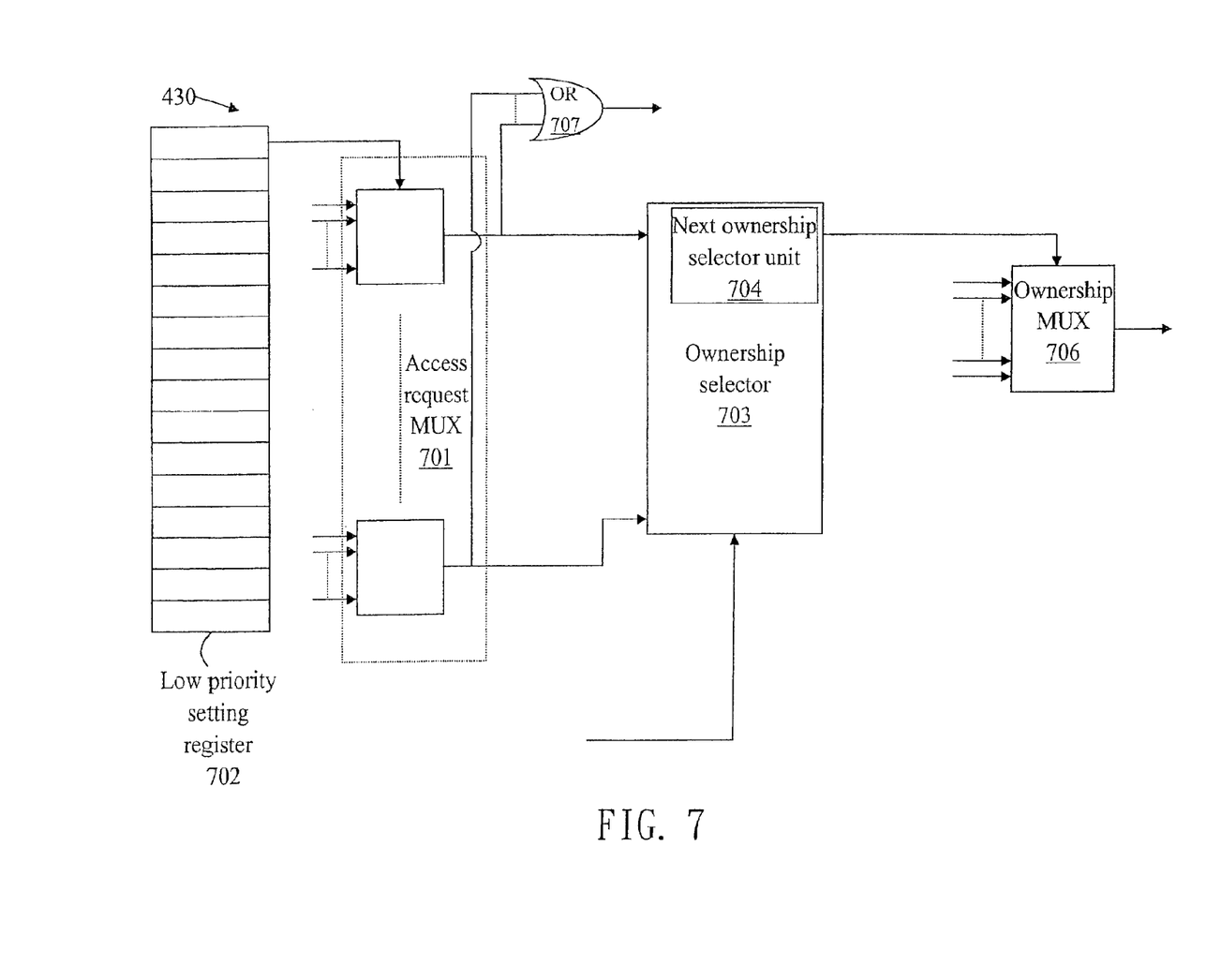
FIG. 7 schematically shows a low level arbitrative apparatus in present invention.

Refer to FIG. 7, the low level arbitrative apparatus 430 comprises of: a plurality of access request MUXs (multiplexers) 701, each one of the access request MUXs 701 receives all access requests respectively and selects one access request grouped to low priority level from those access requests respectively; a low priority setting register 702, setting request number to show which access requests belongs to low priority level; an ownership selector 703, receiving a plurality of access requests which are selected by a plurality of access request MUXs 701, and arranging those selected access requests into a low level priority queue; an ownership MUX 706, finding out the next access request which is waiting for being executed. Furthermore, the ownership selector 703 comprises a next ownership selector unit 704. When an access request is being executed, an asking point out signal is sent out, then the next ownership selector unit 704 points out the position of the next access request and the ownership MUX 706 finds the corresponding request number from low priority setting register 702 according to the position of low level priority queue.

Furthermore, the high level arbitrative apparatus 410 comprises a 2-input AND gate 505 with one input coupled to the ownership selector 503, estimating if the asking point out signal is sent, and another input coupled to a estimation signal, estimating if the next ownership selector unit 504 points to the last position of the high level priority queue (the position for arranging an access request of normal priority level), and an output coupled to the ownership selector 603 of normal level arbitrative apparatus 420. When an asking point out signal is sent out (true), and the next ownership selector unit 504 points to the last position of high level priority queue (true), then outputting an asking point out signal to normal priority level to ask for pointing out the position of the next access request.

Furthermore, the normal level arbitrative apparatus 420 comprises an OR gate 607 with multi-inputs coupled to each output of each access request MUXs 601, and an output coupled to the ownership selector 503 of high level arbitrative apparatus 410; when an access request of normal priority level is going to be asked, arranging this access request into the last position of high level priority queue. Additionally, the normal level arbitrative apparatus 420 also comprises a 2-input AND gate 605 with one input coupled to the ownership selector 603, estimating if the asking point out signal is sent, and another input coupled to a estimation signal, estimating if the next ownership selector unit 604 points to the last position of the normal level priority queue (the position for arranging an access request of low priority level), and an output coupled to the ownership selector 703 of low level arbitrative apparatus 430. When an asking point out signal is sent out (true), and the next ownership selector unit 604 points to the last position of normal level priority queue (true), then outputting an asking point out signal to low priority level to ask for pointing out the position of the next access request.

Furthermore, the low level arbitrative apparatus 430 comprises an OR gate 707 with multi-inputs coupled to each output of each access request MUXs 701, and an output coupled to the ownership selector 603 of normal level arbitrative apparatus 420; when an access request of low priority level is going to be asked, arranging this access request into the last position of normal level priority queue. As the description above, without increasing accessing speed and bus bandwidth, the present invention provides a better method of arranging priority queue. The present invention also provides an apparatus and a method for arbitrating among different priority levels. An arbitrative mechanism with the concept of the present invention can arbitrate a large number of access requests efficiently. If there has a higher priority access request in the highest level priority queue, the higher priority access request can be accessed in a short time, thus the access request and system do not fail due to long waiting time.

Finally, those skilled in the art should appreciate that they can readily use the disclosed conception and specific embodiment as a basis for designing or modifying other structures for carrying out the same purpose of the present invention without departing from the spirit and scope of the invention as defined by the appended claims.

What is claimed is:

1. A method for arranging a priority queue, comprising the following steps:
   counting latency and cycle of each of a plurality of access requests in the priority queue;
   counting total cycles of all access requests in the priority queue; and
   comparing latency of each of the plurality of access requests with the total cycles;
   determining whether said latency of said access request is smaller than said total cycles; and
   arranging said access request into the priority queue once again when latency of said access request is smaller than said total cycles.

2. As the method of claim 1, wherein if said latency of each access request in said priority queue is larger than said total cycles, executing said plurality of access requests according to a sequence of the priority queue.

3. As the method of claim 1, further comprising:
   counting a maximum during cycles between two same access requests and comparing with said latency when said access request is arranged when latency of said access request is smaller than said total cycles, if said latency is smaller than said maximum during cycles, then arranging said access request into said priority queue again.

4. As the method of claim 1, further comprising:
   recounting new total cycles when said access request is arranged when latency of said access request is smaller than said total cycles, and comparing with said latency of each access request, if the latency of another access request is smaller than said new total cycles, then arranging said access request into the priority once again, else executing said plurality of access requests according to said sequence of said priority queue.

5. As the method of claim 1, wherein the positions of additional arranged access requests are the positions which can let interval of each during cycle of these same access requests equally.

6. As the method of claim 1, wherein said method can be used in an arbitrative mechanism.

7. A method of arbitration for different priority levels, comprising the following steps:
   receiving a plurality of access requests;
   separating said plurality of access requests into a plurality of different priority levels; and
   arranging said plurality of access requests of each priority level as a priority queue, comprising:
      counting each cycle and latency of said plurality of access requests;
      counting total cycles of all access requests; and comparing latency of each of the plurality of access requests with said total cycles;
      wherein if said latency of said access request is smaller than said total cycles, then arranging said access request into said priority queue once again, else executing said plurality of access requests according to said sequence of said priority queue.

8. As the method of claim 7, further comprising:
   counting the maximum during cycles between two same access requests and comparing with said latency when said access request is arranged when latency of said access request is smaller than said total cycles, if said latency is smaller than said maximum during cycles, then arranging said access request into said priority queue again.

9. As the method of claim 7, further comprising:
   recounting new total cycles when said access request is arranged when latency of said access request is smaller than said total cycles, and comparing with said each latency of each access request, if said latency of another access request is smaller than said new total cycles, then arranging said access request into the priority once again, else executing the plurality of access requests according to said sequence of said priority queue.

10. As the method of claim 7, wherein the positions of additional arranged access requests are the positions which can let interval of each during cycle of those same access requests equally.

11. As the method of claim 7, wherein each access request is respectively arranged in priority queue with corresponding request number.

12. As the method of claim 7, further comprising:
   selecting one of said access requests of one of said priority queue to execute, and pointing out the next access request which has the priority.

13. As the method of claim 7, after finishing executing all access requests of a priority level in said priority queue, then executing one of said access request of next priority level, then go back to execute said access request of highest priority level.

* * * * *